(12) United States Patent
Shaw et al.

(10) Patent No.: US 10,824,454 B2
(45) Date of Patent: Nov. 3, 2020

(54) 5G DYNAMIC SLICE AND NETWORK IDENTITY INSTANTIATION, TERMINATION, AND ACCESS MANAGEMENT SYSTEM AND METHOD

(71) Applicant: AT&T Intellectual Property I, L.P., Atlanta, GA (US)

(72) Inventors: Venson Shaw, Kirkland, WA (US); Sangar Dowlatkhah, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/623,829

(22) Filed: Jun. 15, 2017

(65) Prior Publication Data

US 2018/0367997 A1 Dec. 20, 2018

(51) Int. Cl.
| | |
|---|---|
| *G06F 9/455* | (2018.01) |
| *H04W 48/18* | (2009.01) |
| *H04L 12/24* | (2006.01) |
| *H04W 12/08* | (2009.01) |
| *H04W 84/04* | (2009.01) |
| *H04W 92/02* | (2009.01) |
| *H04L 12/26* | (2006.01) |

(52) U.S. Cl.
CPC ...... *G06F 9/45533* (2013.01); *H04L 41/0896* (2013.01); *H04L 41/5019* (2013.01); *H04W 12/0804* (2019.01); *H04W 12/0806* (2019.01); *H04W 12/0808* (2019.01); *H04W 48/18* (2013.01); *H04L 43/0876* (2013.01); *H04W 84/042* (2013.01); *H04W 92/02* (2013.01)

(58) Field of Classification Search
CPC ... H04W 12/08; H04W 48/18; H04W 84/042; H04W 92/02; H04W 12/0806; H04W 12/0804; H04W 12/0808; G06F 9/45533; H04L 41/0896; H04L 41/5019; H04L 43/0876
See application file for complete search history.

(56) References Cited

U.S. PATENT DOCUMENTS 7,240,364 B1   7/2007   Branscomb et al.
8,855,654 B2  10/2014   Agarwal
(Continued)

FOREIGN PATENT DOCUMENTS

EP   2862411 A2      4/2015
WO   WO 2017/025149 A1   2/2017
(Continued)

OTHER PUBLICATIONS

An et al.; "End-to-End Architecture Modularisation and Slicing for Next Generation Networks"; Networking and Internet Architecture; 2016; 13 pages.

(Continued)

*Primary Examiner* — Dinh Nguyen
(74) *Attorney, Agent, or Firm* — BakerHostetler (57) ABSTRACT

Systems and methods provide for management of virtual instances in networks which are at least partially software defined networks. Virtual instances can include network slices, virtual network functions, virtual machines, network resources, and others. Management can include use of a virtualization management registry in conjunction with controllers and gateways.

17 Claims, 6 Drawing Sheets

(56) References Cited

U.S. PATENT DOCUMENTS

| | | | |
|---|---|---|---|
| 8,861,419 B2 | 10/2014 | Korus et al. | |
| 9,042,291 B2 | 5/2015 | Korus et al. | |
| 9,087,319 B2 | 7/2015 | Nguyen | |
| 9,398,509 B1 | 7/2016 | Braun | |
| 9,473,573 B2 | 10/2016 | Patel et al. | |
| 9,509,587 B1 | 11/2016 | Marquardt et al. | |
| 9,596,142 B2 | 3/2017 | Claudel et al. | |
| 9,621,940 B2 | 4/2017 | Sarosi et al. | |
| 9,979,602 B1* | 5/2018 | Chinnakannan | H04L 41/12 |
| 2006/0190571 A1* | 8/2006 | Kim | H04L 12/2805 709/220 |
| 2013/0227672 A1* | 8/2013 | Ogg | G06F 21/00 726/12 |
| 2013/0337822 A1 | 12/2013 | Rubin et al. | |
| 2013/0346619 A1* | 12/2013 | Panuganty | H04L 41/12 709/226 |
| 2014/0059647 A1* | 2/2014 | Immonen | H04L 63/102 726/3 |
| 2014/0082350 A1* | 3/2014 | Zarfoss, III | H04L 63/083 713/155 |
| 2014/0082612 A1* | 3/2014 | Breitgand | G06F 9/45533 718/1 |
| 2015/0006614 A1* | 1/2015 | Suryanarayanan | H04L 67/08 709/203 |
| 2015/0043911 A1 | 2/2015 | Patel et al. | |
| 2015/0063166 A1 | 3/2015 | Sif et al. | |
| 2015/0381493 A1* | 12/2015 | Bansal | H04L 45/30 370/392 |
| 2016/0020946 A1 | 1/2016 | Morper | |
| 2016/0112328 A1 | 4/2016 | Anand | |
| 2016/0154713 A1* | 6/2016 | Zhu | H04L 41/5051 714/4.12 |
| 2016/0156513 A1 | 6/2016 | Zhang et al. | |
| 2016/0182684 A1* | 6/2016 | Connor | G06F 9/45558 709/203 |
| 2016/0234730 A1* | 8/2016 | John | H04W 76/10 |
| 2016/0352537 A1 | 12/2016 | Marquardt et al. | |
| 2016/0352924 A1 | 12/2016 | Senarath et al. | |
| 2016/0353268 A1 | 12/2016 | Senarath et al. | |
| 2016/0353281 A1 | 12/2016 | Senarath et al. | |
| 2017/0054595 A1 | 2/2017 | Zhang et al. | |
| 2017/0083354 A1* | 3/2017 | Thomas | G06F 9/4881 |
| 2017/0085493 A1 | 3/2017 | Senarath et al. | |
| 2017/0086049 A1* | 3/2017 | Vrzic | H04L 67/327 |
| 2017/0332421 A1* | 11/2017 | Sternberg | H04W 76/11 |

FOREIGN PATENT DOCUMENTS

| | | | |
|---|---|---|---|
| WO | WO 2017/058067 A1 | 4/2017 | |
| WO | WO 2017/063708 A1 | 4/2017 | |

OTHER PUBLICATIONS

Martin et al.; "Threat Landscape and Good Practice Guide for Software Defined Networks/5G"; Enisa—European Union Agency for Network and Information Security; Dec. 2015; 73 pages.

Legarrea et al; "CHARISMA—Converged Heterogeneous Advanced 5G Cloud-RAN Architecture for Intelligent and Secure Media Access"; Project 671704 Research and Innovation Action; Jul. 2015; 54 pages.

Pujol, Paul C.; "Deployment of NFV and SFC scenarios"; Master Thesis; Universitat Politecnica De Catalunya; Feb. 2017; 115 pages.

* cited by examiner

5G DYNAMIC SLICE AND NETWORK IDENTITY INSTANTIATION, TERMINATION, AND ACCESS MANAGEMENT SYSTEM AND METHOD

TECHNICAL FIELD

This disclosure relates in general to allocation of services in a network, and more particularly to managing virtual instances in networks.

BACKGROUND

Mobile devices are becoming more sophisticated and powerful and can provide a variety of applications with varied network demands in terms of latency, throughput, data speeds and the like. Network specifications up to 4G primarily serve mobile phones with design parameters meeting this demand. The next generation of mobile networks beyond the 4G LTE mobile networks (5G networks) will provide ultra-high radio speed (20 Gbps/UE), ultra-low latency (E2E in msec), and massive connectivity. 5G networks will serve a variety of devices with different characteristics and needs. For example, mobile broadband, massive internet of things (IoT) networks, and mission-critical IoT devices, and their varied resources in terms of mobility, charging, security, policy control, latency, reliability, et cetera, will be served in 5G environments.

There are many distinct use cases for mobile networks. In one example, a massive IoT service may connect stationary sensors which measure data such as temperature, humidity, precipitation, et cetera. This service will not require features like handover or location update, which serve mobile phones as they travel with their users. Alternately, a mission-critical IoT service (like autonomous driving or remote controlled robots) benefits from low end to end (E2E) latency. It is therefore desirable that network management and organization solutions for meeting service specifications in a variety of environments for a variety of devices be devised.

Adding further complexity, with increasing virtualization in mobile networks, a number of issues may arise. For example, if roaming agreements are outsourced, service may vary, or control plane information (such as sensitive subscriber data) may be leaked. In another example, spoofed virtual instances of network elements (e.g., unauthorized virtual home subscriber servers operating in networks as control plane virtual network functions) can be used to hijack information. Further, as virtualized elements are instantiated, modified, or terminated, tracking and authentication of these elements becomes more complex, which in turn makes control of resources and access to sensitive network segments more complex. It is therefore desirable that network management and organization solutions which increase certainty of control with respect to virtualized elements be devised.

SUMMARY

In an embodiment a method comprises identifying one or more specifications associated with a service supported by a mobile network and generating a virtual instance profile in a virtualization management registry configured to manage virtual instance profiles. The virtual instance profile includes instance resources based on the one or more specifications, and the virtual instance profile is used to authorize access to the instance resources via a virtual instance described by the virtual instance profile. The method also comprises, after generating the virtual instance profile, instantiating the virtual instance in the mobile network, wherein the virtual instance is configured to support the service within the mobile network. The method also comprises associating the instance resources with the virtual instance, wherein the instance resources are based on the one or more specifications.

In an embodiment a system comprises a virtualization management registry configured to store one or more virtual instance profiles. One of the virtual instance profiles is associated with a virtual instance in a mobile network. The system also comprises a software defined network controller configured to instantiate, modify, or terminate the virtual instance. The system also comprises a management gateway configured to communicate with the software defined network controller based on traffic of the mobile network, wherein the management gateway is configured to direct traffic to the virtual instance based on one or more specifications associated with the traffic.

In an embodiment a method comprises identifying one or more specifications associated with a service supported by a mobile network and searching a virtualization management registry for a virtual instance profile matching the one or more specifications. The virtual instance profile is associated with a virtual instance on the mobile network.

These and other embodiments are described in greater detail elsewhere herein. In some of the following descriptions a particular embodiment and its details are used to illustrate aspects disclosed. The applicability of the method is not limited to the particular embodiments described herein.

BRIEF DESCRIPTION OF THE DRAWINGS

To better understand and appreciate the disclosed aspects, refer to the following detailed description in connection with the accompanying drawings.

DETAILED DESCRIPTION OF ILLUSTRATIVE EMBODIMENTS

The disclosure generally concerns management of virtual instances, including network slices, virtual network functions (VNFs), virtual machines (VMs), network resources, and others in a 5G network. Tracking the activity (e.g., registration, authentication, changing, and de-registration) of these virtual instances, which can be instantiated or terminated on demand, poses a number of technical challenges and vulnerabilities.

VMs and VNFs are used in a variety of virtualized or semi-virtualized environments supporting mobile networks and other technologies. With particular focus on network slices, these can be conceptualized as partitions in a network utilizing virtualization. A network slice can behave as if it is an independent network, and provide more flexible architecture for a service or group of clients supported by the network slice. This disclosure provides for managing such slices and other virtualized network elements.

As suggested above, different entities utilizing 5G network services present a variety of requests and specifications, with the varieties and numbers multiplying in growing IoT network environments. These different resource demands or specifications can be accommodated using VMs, VNFs, virtualized resources, and in particular embodiments by dynamic network slicing. Network slicing capitalizes on the capability of software defined networking (SDN), network function virtualization (NFV) orchestration and analytics.

Virtualization in mobile networks allows resources to be allocated from a cloud pool of resources. In 5G mobile networks, network slicing will allow administrators to design, deploy, and customize different "slices" of the network, running on a common network infrastructure. Each slice will have independent characteristics for delivering a particular service type and sharing resources between services and slices. Network slicing will allow telecom operators to provide networks on an as-a-service basis and meet the wide range of use cases. Thus, in a single 5G system, network slicing technology can provide connectivity for smart meters with a network slice that connects IoT devices with a high availability and high reliability data-only service, with a given latency, data rate and security level. At the same time, the technology can provide another network slice with very high throughput, high data speeds and low latency for an augmented reality service. These are example use cases only, and it will be understood in light of the disclosure that example, rather than exhaustive, details will be given as to applications for aspects of the disclosure.

The object of slicing in general is to use virtualization technology to architect, partition, and organize computing and communication resources of a physical infrastructure to enable flexible support of diverse use case realizations. With network slicing, one physical network is "sliced" into multiple virtual networks, which may each be architected and optimized for a specific requirement and/or specific application/service. A network slice is a self-contained network segment in terms of operation and traffic flow and can have its own network architecture, engineering mechanisms and network provision. Different slices are isolated from one another in the control plane(s) and user plane(s).

Smart mobile devices integrated into a 5G network will be able to support existing and emerging types of applications with diverged service requirements and spectrum bands (e.g. existing cellular band such as 700 mHz, and new 5G high frequency bands for mmW), et cetera. To meet such diverged requirements improving smart mobile device efficiency is very important. Virtualization and slicing network resources for different types of services to allow all services sharing the same network resources, yet with some partitions that most efficiently deploy resources for each slice.

However, this dynamic virtualized network landscape, which can add or drop "machines" (VMs) on demand rather than tracking permanent hardware, and may instantiate or terminate new domains as slices, is more difficult to track, control, utilize, and secure. Therefore, 5G networks (as well as legacy networks) will benefit from the disclosures herein.

Figure 1:
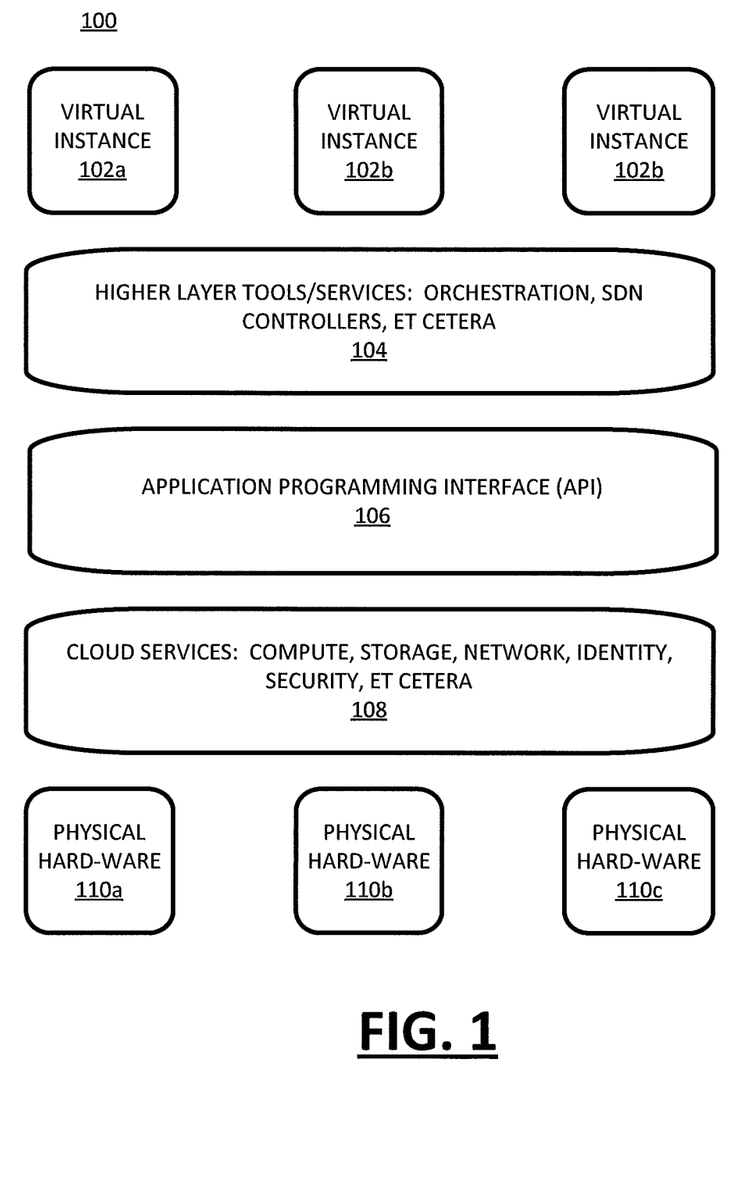
FIG. 1 illustrates a block diagram showing an example architecture for virtual instances.

Turning to the drawings, FIG. 1 is a representation of an example system 100 (e.g., cloud computing platform, virtualized environment, network) showing techniques for implementing aspects disclosed herein. System 100 may comprise a cloud computing platform with a software defined network (SDN).

The physical hardware of the cloud platform may comprise multiple servers 110*a*, 110*b*, 110*c*. The cloud computing nodes, controller nodes, networking nodes, et cetera which provide the compute, storage, networking, identity, security and other cloud services 108 are implemented on the hardware 110*a*, 110*b*, 110*c*. In embodiments, customized or special-purpose hardware may be utilized without departing from the scope or spirit of the innovation. An Application Programming Interface (API) 106 into the cloud services is available for constructing higher layer services. Higher layer services 104 such as SDN controllers, Firewall as a Service, Dashboards, and Orchestration tools, et cetera, may be implemented using the API 106.

Virtual Instances 102*a*, 102*b*, 102*c*, et cetera, may use the higher layer services 104, as well as API 106, to create virtual network function modules that implement various network functions. Various aspects herein can be implemented as virtual network functions, such as systems in a network region, management elements of the network region itself, et cetera. Further, the control plane tool and techniques for developing control planes described herein can be implemented as applications, models, or other software which are virtualized. Virtual Instances 102*a*, 102*b*, 102*c*, et cetera, may be Virtual Network Functions (VNFs). In alternative or complementary embodiments Virtual Instances 102*a*, 102*b*, 102*c*, et cetera, may include network slices. In alternative or complementary embodiments Virtual Instances 102*a*, 102*b*, 102*c*, et cetera, may include Virtual Machines (VMs) and/or virtual network resources.

System 100 of FIG. 1 can be used to implement distributed virtual network functions on all or some nodes of a network. This can be achieved by one or many replicas of the cloud computing platform, or components thereof. In embodiments, network elements such as gateways, routers, mobility management entities, home subscriber servers, et cetera, can be implemented as virtualized instances.

Figure 2:
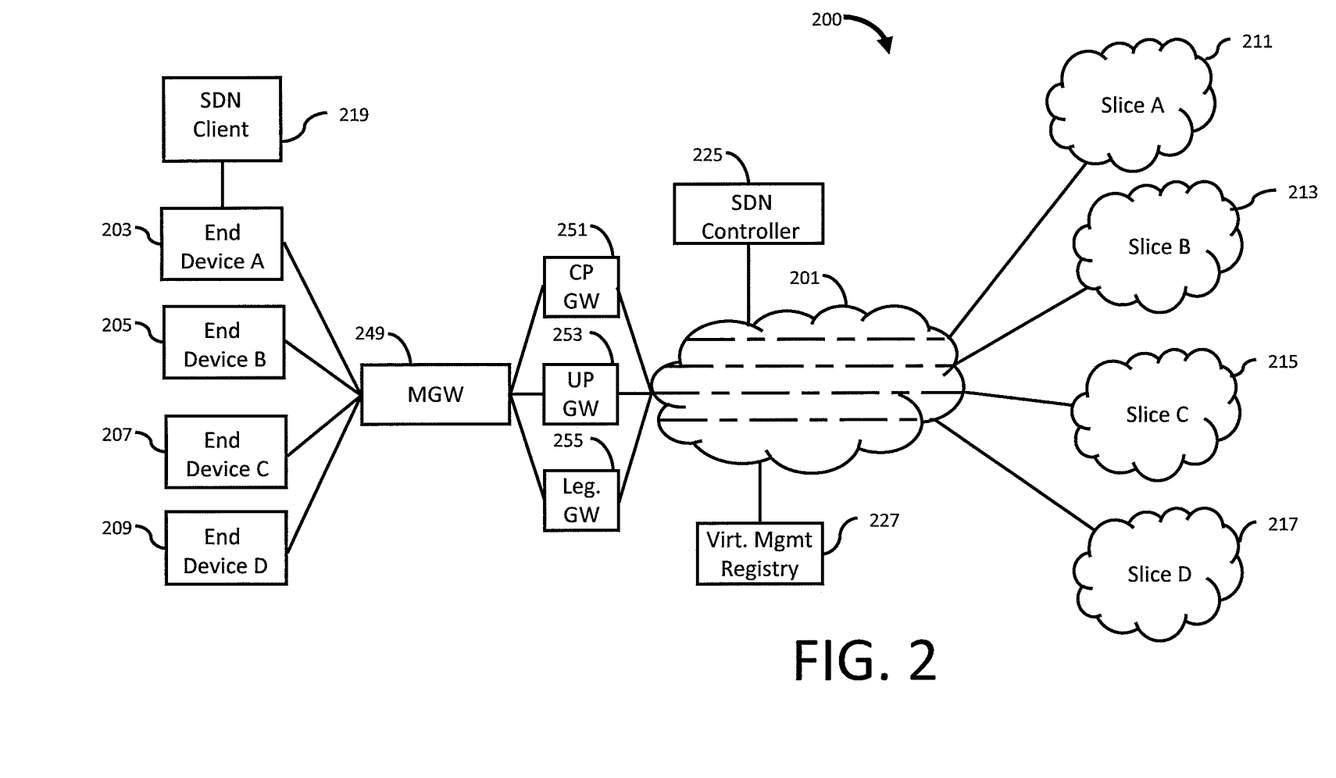
FIG. 2 is a block diagram of an example network architecture in which the system of the present disclosure operates

Illustrated in FIG. 2 is a system 200 illustrating an example 5G network architecture including a 5G network 201 connected to a plurality of end devices, including but not limited to end device A 203, end device B 205, end device C 207 and end device D 209. End device A may be any one of a variety of end devices such as mobile device, computer, an Internet of things (IoT) device and the like. Each end device may have a particular use case, for example end device A 203 may be used for autonomous vehicle control which may require very low latency, and high availability and reliability. Alternately end device B may be used for delivery of media on demand requiring high user throughput, a slightly higher latency requirements and a slightly lower availability requirement. Each end device may be supported by a separate network slice, for example end device A 203 may be supported by network slice A 211, end device A 205 may be supported by network slice B 213, end device A 207 may be supported by network slice C 215, and end device D 209 may be supported by network slice D 217. The technique of network slicing allows for the definition of multiple logical networks (or slices) on top of the same physical infrastructure, sharing a common virtualization environment (e.g., cloud) while providing network environment flexibility and preventing or limiting interference between services. Resources can be dedicated exclusively to a single slice or shared between different slices. There are different types of resources such as computing, storage, access equipment, transport, VNFs, and so on. A network slice is built to address a desired behavior from the network. Such behavior can be associated with security, data-flow isolation, quality of service, reliability, independent charging and so on. A network slice may support one or many services, and can be used to create a virtual operator network and may provide customized service characteristics. Network slicing can be used for several purposes: a complete private network, a copy of a public network to test a new service, or a dedicated network for a specific service. The end devices, such as for example end device A 203 may be provided with an SDN client 219 having one or more applications. A SDN controller 225 and a virtualization management registry 227 may be provided in the 5G network 201 to manage slices as they are instantiated, terminated, or operating. 5G networks such as 5G network 201 can separate the data and control planes.

System 200 can include, within 5G network 201 or outside 5G network 201, a variety of gateways. In an embodiment, one or more management gateways 249 can receive traffic from one or more of end device A 203, end device B 205, end device C 207 and end device D 209. Management gateway(s) 249, placed at the edge of the network cloud, can be used to provide a hybrid solution allowing greater virtualization in legacy networks or networks including or interacting with legacy gateways. Management gateway 249 can provide one aspect for controlling the flow of information through 5G and legacy networks and/or network elements. Management gateway 249 communicates with one or more virtualized or physical gateways, which can include but are not limited to control plane gateway 251, user plane gateway 253, and/or legacy gateway 255. In embodiments alternative to that illustrated, control plane gateway 251, user plane gateway 253, and legacy gateway 255 can be combined in a single virtualized gateway. In embodiments, control plane gateway 251, user plane gateway 253, legacy gateway 255, and/or combinations thereof can be associated with a particular application, service, class of devices, customer, et cetera. Management gateway(s) 249, control plane gateway 251, user plane gateway 253, and legacy gateway 255 interact with SDN controller 225 to route traffic to the appropriate virtual slice(s) among network slice A 211, network slice B 213, network slice C 215, and/or network slice D 217, et cetera. By leveraging SDN controller 225, management gateway(s) 249 need not need to be aware of the location of virtual gateways so long as they are on or in 5G network 201 accessible by SDN controller 225. In embodiments, there can be multiple SDN controllers 225 (or modules of SDN controller 225) operatively coupled with one another, including an access SDN controller which communicates with access points or edge nodes, a core network SDN controller which communicates with core network gateways, a transport SDN controller which communicates with a transport layer, a management SDN controller which communicates with a service layer and applications (e.g., fixed applications, at rest applications, mobile applications), and/or others.

While end device A 203, end device B 205, end device C 207 and end device D 209 are shown connecting directly to management gateway(s) 249, in embodiments end device A 203, end device B 205, end device C 207 and end device D 209 connect to an access point (e.g., eNodeB) which is in turn coupled to management gateway(s) 249. Further, while FIG. 2 is described in portions as directing traffic to network slices, such traffic can also be supported by virtual instances with a slice or in a network not employing slicing.

Virtualization management registry 227 stores profiles associated with virtual instances of 5G network 201. The profiles are dynamic and change according to the parameters and operation of associated virtual instances. In the illustrated embodiment, virtualization management registry 227 stores profiles for each of network slice A 211, network slice B 213, network slice C 215, and/or network slice D 217, et cetera, as well as any other virtual instances (e.g., VNFs, VMs, network resources) in 5G network 201 or its slices. Virtualization management registry 227 provides management of virtual instances through associated profiles including tracking, management, authentication, validation, et cetera. Profiles can include information such as utilization, permissions, service level requirements, access information, links, and others.

To ensure that virtual instances on a network are authorized, valid, tracked, and utilized, virtualization management registry 227 can be utilized according to particular rules. To ensure all new virtual instances are managed, registration of virtual instances by way of creating associated profiles in virtualization management registry 227 can occur before instantiation of the virtual instance. Likewise, to ensure consistency, compatibility, and security, virtual instances being terminated can be de-registered by removing or deactivating associated profiles from or in virtualization management registry 227 prior to or concurrent with virtual instance termination. Before actions are taken using a virtual instance, before a virtual instance is provided traffic or access, or before a virtual instance is modified (e.g., grow or de-grow), existing virtual instance profiles can be updated, and the virtual instance and/or profile can be validated. SDN controller 225 can cause such modifications (e.g., grow or de-grow) based on monitoring profiles within virtualization management registry, changing virtual instance parameters (e.g., size, resources, quality of service) based on its utilization or performance. Once registered or validated, virtual instances can communicate with one another and/or send and retrieve information from 5G network 201 on behalf of users, applications, and other clients with which they interact.

As discussed, in embodiments, virtual instances having associated profiles can be network slices. Further VNFs can be virtual instances providing various network functionality including but not limited to action as virtual control plane elements such as mobility management entities (MMES), home subscriber servers (HSSs), policy and charging rules functions (PCRFs), gateways, et cetera, and/or as virtual user plane (or data plane) elements such as serving gateways (SGWs), packet data network gateways (PGWs), et cetera. Virtual instances can also include VMs or network resources.

Besides authentication and validation, the profiles allow tracking of virtual instance utilization. In this fashion, SDN controller 225 or other elements can redirect traffic from a virtual instance reaching utilization capacity, instantiate a new virtual instance to service extra capacity, or modify the existing virtual instance to accommodate more or less capacity. By providing tracking of all virtual instances including related parameters, the virtualization management registry 227 and associated functionality (e.g., using SDN controller 225) provides a comprehensive view of virtual instances throughout 5G network 201.

In 5G network 201, the control plane and user plane may be separated. Management gateway(s) 249 can retrieve specifications with traffic including service attributes (e.g., latency, performance, quality of service, bitrate, and others) and determines which gateway(s) to route user plane and/or control plane traffic (which can include legacy gateways managing both). Control plane traffic can then be transmitted (e.g., using one of control plane gateway 251, legacy gateway 255, or others) to communicate with virtualization management registry 227 thereby authenticating and/or validating virtual instances associated with the traffic. Once authenticated, user plane traffic is authorized using the virtual instances (e.g., via user plane gateway 253, legacy gateway 255, or others), providing the functionality or data requested by the traffic.

Figure 3:
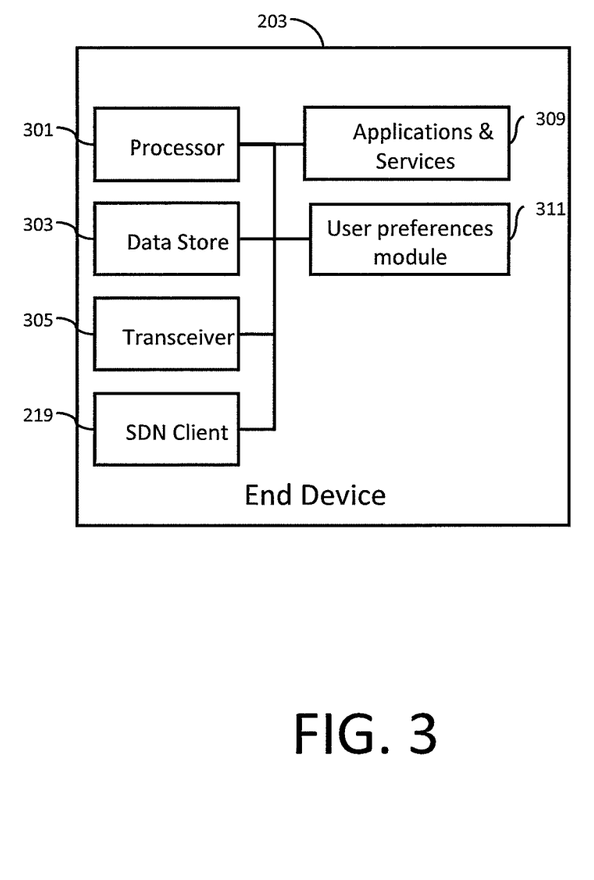
FIG. 3 is a block diagram of an example end device.

Illustrated in FIG. 3 is a block diagram of an example end device such as end device A 203. End device 300 may include a processor 301, a data store 303, a transceiver 305, an SDN client 219 a set of application and services 309 that are executed by the processor 301 and a user preferences module 311. The end device A 203 may be a mobile device, a computer, a laptop, a PDA, an IoT device (e.g., standalone sensor, appliance, vehicle, structure, utility, commercial system), et cetera.

Figure 4:
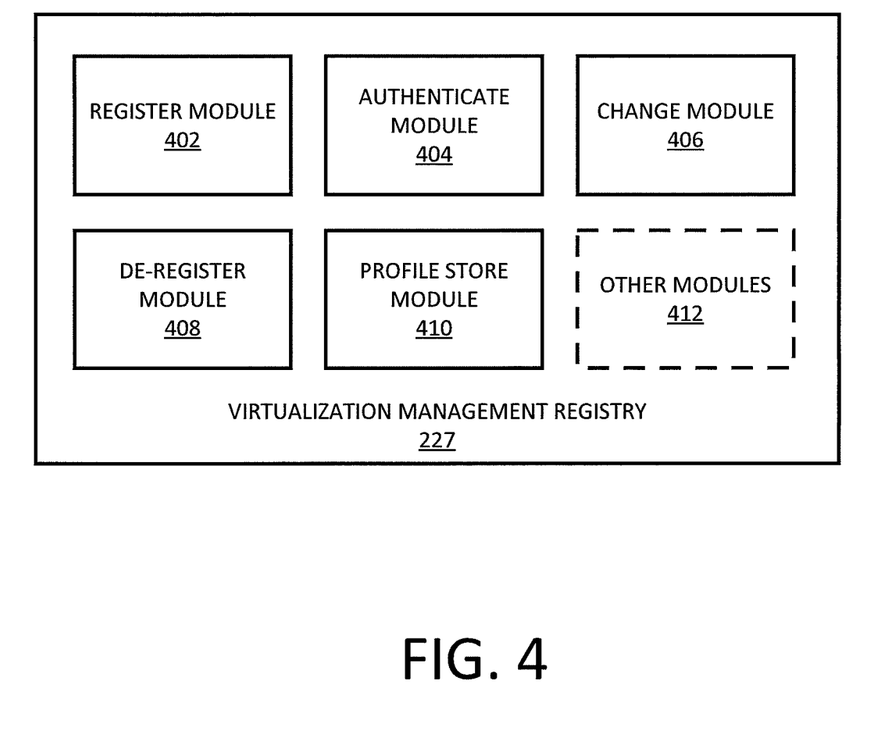
FIG. 4 is a block diagram of an example virtualization management registry.

FIG. 4 illustrates virtualization management registry 227 in greater detail. Virtualization management registry 227 includes a variety of modules, including register module 402, authenticate module 404, change module 406, de-register module 408, profile store module 410, and other modules 412.

Register module 402 is configured to generate the virtual instance profile before the software defined network controller instantiates the virtual instance. This can be performed by virtualization management registry 227 or in conjunction with, e.g., SDN controller 225, gateways of system 200, or other network elements. Authenticate module 404 is configured to validate the virtual instance profile based on a query or traffic. Validation includes managing access, authenticating, confirming that a virtual instance is associated with a valid (e.g., existing and active) virtual instance profile in virtualization management registry 227 before using it to send or receive traffic from a client or to/from a network element, confirming parameters (e.g., utilization, load, permissions, service level) before making changes to an associated virtual instance, and others. Change module 406 is configured to modify the network instance. This includes performing grow or de-grow operations based on specifications, utilization, performance, and other parameters. De-register module 408 is configured to remove the virtual instance profile before the software defined network controller terminates the virtual instance. Profile store module 410 is configured to store the virtual instance profiles, wherein the virtual instance profiles include at least a virtual instance identity and instance resources associated with the virtual instance. As suggested, these profiles can include various information such as permissions, relationships, capabilities, metrics, et cetera. Other modules 412 can include a matching module configured to compare incoming requests or other traffics from users, devices, applications, services, et cetera, to existing virtual resources in virtualization management registry 227. Additional functionality described herein can also be performed by other modules 412. All modules of virtualization management registry 227 are interoperable and intercommunicate.

Figure 5:
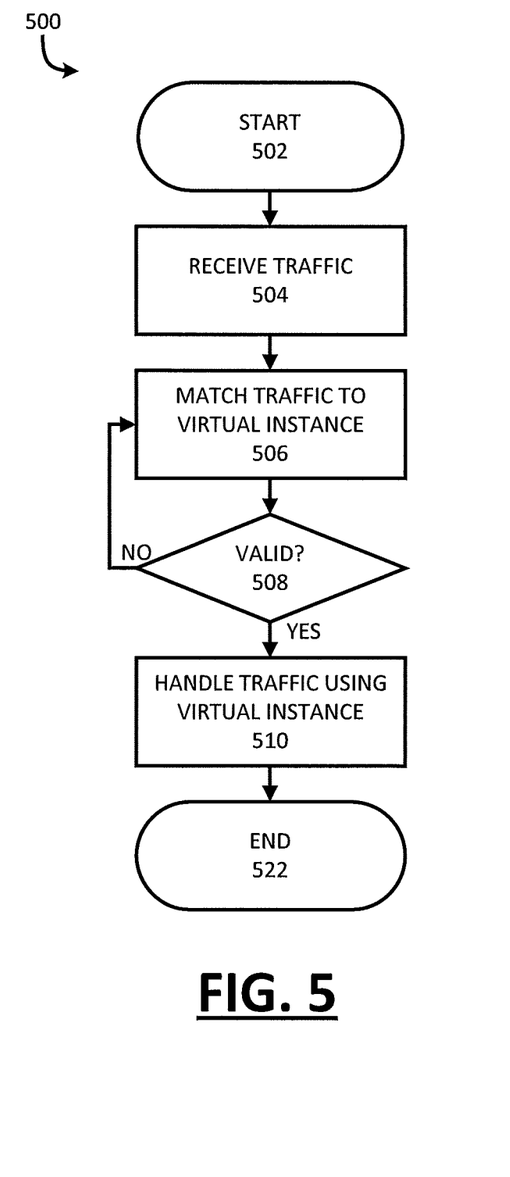
FIG. 5 is a flow chart of an example methodology disclosed herein.

FIG. 5 illustrates an example flow chart of a methodology 500 for managing network traffic according to disclosures herein. Methodology 500 begins at 502 and proceeds to 504 where traffic is received over a mobile network. In an embodiment, the traffic is received at a management gateway as described herein. The traffic can be received at a management gateway directly from a point of origin (e.g., computer, mobile device, Internet of Things device) or using various intermediary network elements (e.g., an access point, other gateways, an interface between networks or domains).

At 506, a determination can be made matching the traffic to a virtual instance profile from a virtualization management registry. The determination can examine the content or characteristics of the traffic, or information regarding devices, services, customers or clients, domains, et cetera, to determine specifications, requirements, service level(s), trends, and other details determining the parameters or constraints of virtual instances which can be used with the received traffic. For example, a particular subscriber may subscribe to a service level supported by a certain network slice having certain resources. In another example, a particular class of devices (e.g., autonomous vehicles, smart home devices, medical devices, security systems) may be supported by a type of virtual machine, virtual network function, or virtual network resource. Based on this information associated with the traffic and virtual instances described in the virtualization management registry, the traffic can be matched to one or more virtual instances.

Thereafter, a validation of the matched virtual instance can be performed at 508. This can include determining whether the matched virtual instances possess the permissions to handle the traffic, access network domains associated with the traffic, utilize network resources associated with the traffic, et cetera. In an embodiment the virtual instance can be authenticated or identified to a network or portion thereof, to the originator of the traffic, or to other network elements. In an embodiment, the traffic or portions thereof can also be identified, authenticated, granted permission, et cetera, at 508.

If the validation determination at 508 fails, methodology 500 can recycle to 506 where additional virtual instance profiles matching the traffic can be sought. If the validity determination at 508 is successful, methodology 500 can proceed to 510 where the traffic is handled using the virtual instance associated with the matched virtual instance profile. This can include routing the traffic, providing a service, storing data, analyzing data, transforming data, generating a response, transmitting a response, et cetera. Thereafter at 512 methodology 500 can end.

Figure 6:
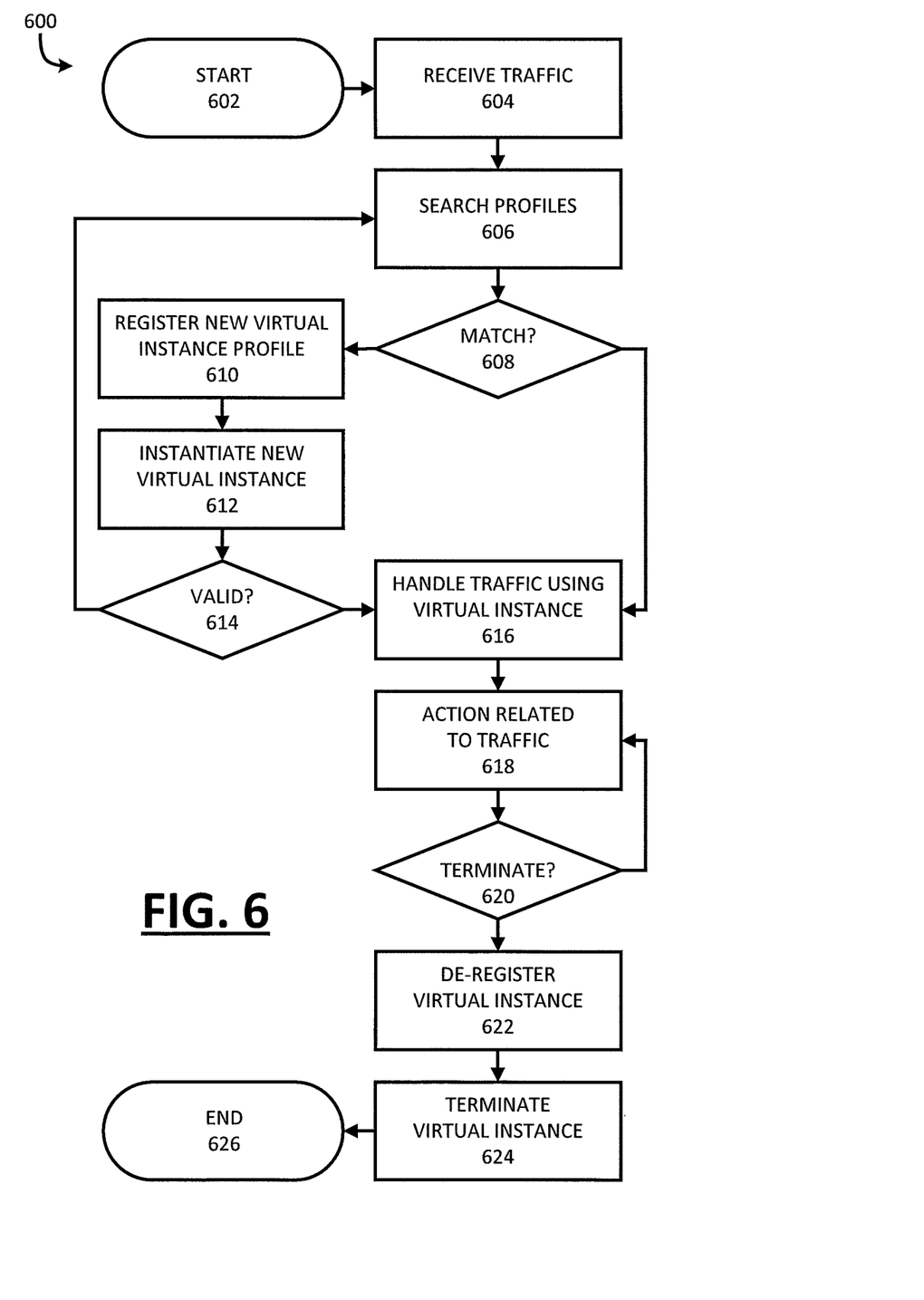
FIG. 6 is a flowchart of another example methodology disclosed herein.

FIG. 6 illustrates an example flow chart of a methodology 600 for managing network traffic according to disclosures herein. Methodology 600 begins at 602 and proceeds to 604 where traffic is received over a mobile network. In an embodiment, the traffic is received at a management gateway as described herein. The traffic can be received at a management gateway directly from a point of origin (e.g., computer, mobile device, Internet of Things device) or using various intermediary network elements (e.g., an access point, other gateways, an interface between networks or domains).

At 606, a query of a virtualization management registry is made for a profile matched to the traffic. Based on this query, at 608 a determination can be made as to whether the traffic matches a virtual instance profile in a virtualization management registry. The determination can examine the content or characteristics of the traffic, or information regarding devices, services, customers or clients, domains, et cetera, to determine specifications, requirements, service level(s), trends, and other details determining the parameters or constraints of virtual instances which can be used with the received traffic. For example, a particular subscriber may subscribe to a service level supported by a certain network slice having certain resources. In another example, a particular class of devices (e.g., autonomous vehicles, smart home devices, medical devices, security systems) may be supported by a type of virtual machine, virtual network function, or virtual network resource. If, based on this information associated with the traffic and virtual instances described in the virtualization management registry, the traffic can be matched to one or more virtual instance profiles, methodology 600 proceeds to 616.

If no match is found (because, e.g., no appropriate virtual instance exists, because appropriate virtual instances are at capacity) methodology 600 proceeds to 610 where a new virtual instance profile is registered in a virtualization management registry. The new virtual instance profile matches the traffic received. After registration at 610, a virtual instance represented by the new virtual instance profile is instantiated at 612. By performing instantiation at 612 after registration at 610, the virtual instance can be tracked and validated from before it exists in the network until its termination. In an alternative or complementary embodiment, a matched virtual instance can be modified (e.g., grow, de-grow) at 612.

At 614, validation of the matched virtual instance(s) can be tested. This can include determining whether the matched virtual instances possess the permissions to handle the traffic, access network domains associated with the traffic, utilize network resources associated with the traffic, et cetera. In an embodiment the virtual instance can be authenticated or identified to a network or portion thereof, to the originator of the traffic, or to other network elements. In an embodiment, the traffic or portions thereof can also be identified, authenticated, granted permission, et cetera, at 614. In an embodiment, validation is concurrent with registration, and no test is performed at 614.

If the validation at 614 fails, methodology 600 can recycle to 606 where additional virtual instance profiles matching the traffic can be sought. If the validity determination at 614 is successful, methodology 600 can proceed to 616 where the traffic is handled using the virtual instance associated with the matched virtual instance profile. In embodiments, follow-on actions related to the traffic can be completed at 618. Aspects performed at 616 or 618 can include routing the traffic, providing a service, storing data, analyzing data, transforming data, generating a response, transmitting a response, et cetera.

After completing activity at 616 and/or 618, a determination can be made at 620 as to whether to terminate the virtual instance. This determination can be based on, e.g., virtual instance utilization, virtual instance priority (among other virtual instances), and other considerations. If the determination at 620 returns negative, methodology 600 can recycle to 618 where additional actions involving the virtual instance may occur.

If the determination at 620 returns positive, methodology 600 proceeds to 622 where the virtual instance profile is de-registered from the virtualization management registry. Thereafter (or in some embodiments concurrently), the virtual instance is terminated at 624. In this fashion, the real-time tracking of the virtual instance continues until the virtual instance is terminated. By de-registering the profile associated with the virtual instance before or concurrent with termination of the virtual instance, real-time management of virtual entities and network security can be maintained. Thereafter, at 626, methodology 600 ends.

In another example methodology, an eNodeB or other access point receives device traffic. The eNodeB communicates with a management gateway for a software defined network. The management gateway routes the traffic to a node associated with the traffic, such as an application node. Using a control plane gateway, virtual instances to be leveraged on behalf of the device traffic are identified validated from a virtualization management registry. A profile associated with the virtual instances is used to provide identity and validation information back to the control plane gateway. Once authorized, the virtual instance can communicate with the node associated with the traffic. Return data can be sent via the eNodeB to the requesting device, and the eNodeB may communicate with the gateways or the virtual instance itself to receive additional requests or data from the device.

As described above, the example embodiments can be in the form of processor-implemented processes and devices for practicing those processes, such as a server in a regional network or cloud data center. The example embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes a device for practicing the example embodiments. The example embodiments can also be in the form of computer readable media or computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the example embodiments. When implemented on a general-purpose microprocessor, the computer program code segments configure the microprocessor to create specific logic circuits.

While the disclosure has been described with reference to example embodiments, it will be understood by those skilled in the art that various changes may be made and equivalents may be substituted for elements thereof without departing from the scope or spirit of the disclosure. In addition, many modifications may be made to adapt a particular situation or material to the teachings of the disclosure without departing from the scope thereof. Therefore, it is intended that the disclosure not be limited to the particular embodiments disclosed for carrying out aspects of the disclosure, but that the disclosure will include all embodiments falling within the scope of the claims. Moreover, the use of the terms first, second, et cetera, do not denote any order or importance, but rather the terms first, second, et cetera, are used to distinguish one element from another. Furthermore, the use of the terms a, an, et cetera, do not denote a limitation of quantity, but rather denote the presence of at least one of the referenced item.

What is claimed:

1. A system, comprising:
  a virtualization management registry configured to store one or more virtual instance profiles,
    wherein a virtual instance profile among the virtual instance profiles is associated with a network slice virtualizing an instance of a logical network in a mobile network,
    wherein the virtual instance profile comprises utilization information, permissions information, and service level requirements information,
    wherein the network slice is allocated resources satisfying a performance requirement of a class of use, and
    wherein the virtualization management registry tracks an activity of the virtual instance and tracks a virtual instance utilization using the virtual instance profile;

a software defined network controller configured to instantiate, modify, or terminate the network slice;

a register module of the virtualization management registry, wherein the register module is configured to generate the virtual instance profile before the software defined network controller instantiates the network slice;

an authenticate module, wherein the authenticate module confirms, based on a query or traffic, that the virtual instance is associated with a valid virtual instance profile in the virtualization management registry before using the virtual instance to send or receive traffic from a client or a network element;

a de-register module of the virtualization management registry, wherein the de-register module is configured to remove the virtual instance profile before the software defined network controller terminates the network slice; and a management gateway configured to communicate with the software defined network controller based on traffic of the mobile network, wherein the traffic is associated with the class of use, wherein the management gateway is configured to direct the traffic to the network slice based on a specification associated with the traffic, wherein the specification satisfies the performance requirement for the class of use.

2. The system of claim 1, further comprising:
a change module of the virtualization management registry, wherein the change module is configured to modify the network slice.

3. The system of claim 1, further comprising:
a profile store module of the virtualization management registry, wherein the profile store module is configured to store the virtual instance profiles, wherein the virtual instance profiles include at least a virtual instance identity and instance resources associated with the network slice.

4. The system of claim 1, wherein the register module validates the virtual instance profile to the mobile network.

5. The system of claim 1, wherein the class of use is for a virtual service.

6. The system of claim 1,
wherein the virtualization management registry is configured to store a second virtual instance profile associated with a second network slice,
wherein the network slice is isolated from the second network slice on at least a control plane and a data plane of the mobile network, and
wherein the specification includes different network resources than a second specification associated with the second network slice.

7. The system of claim 1, wherein the software defined network controller is configured to grow or de-grow the network slice by adding or removing resources based on the specification.

8. The system of claim 1, wherein the management gateway is further configured to direct traffic to a second network slice based on at least one different specification among the specification associated with the traffic.

9. The system of claim 1, wherein the resources allocated to the logical network include one or more of specified computing, storage, and networking resources.

10. The system of claim 1, wherein the resources allocated to the logical network affect one or more of specified availability, data capability, voice capability, latency, throughput, data rate, and security level.

11. The system of claim 4, wherein validation includes determining the network slice is associated with an existing and active virtual instance profile before routing traffic to or from the network slice.

12. The system of claim 4, wherein validation includes confirming one or more of the resources, utilization, or permissions associated with the network slice.

13. The system of claim 1, wherein the software defined network controller creates additional capacity by instantiating a new virtual instance in response to the virtual instance reaching a utilization capacity.

14. The system of claim 1, wherein the software defined network controller modifies the virtual instance to adjust a capacity for the virtual instance in response to the virtual instance reaching a utilization capacity.

15. The system of claim 1, wherein the software defined network controller modifies a virtual instance by monitoring virtual instance profiles within the virtualization management registry and based on an associated utilization for the virtual instance modifies the virtual instance by changing virtual instance parameters associated with the virtual instance.

16. The system of claim 1, further comprising a matching module configured to compare the query or traffic to a virtual instance profile from the virtualization management registry.

17. The system of claim 1, wherein the network slice is allocated resources satisfying a performance requirement of a class of device.

* * * * *